(12) United States Patent
Mann

(10) Patent No.: US 8,295,275 B2
(45) Date of Patent: Oct. 23, 2012

(54) TAGGING NETWORK I/O TRANSACTIONS IN A VIRTUAL MACHINE RUN-TIME ENVIRONMENT

(75) Inventor: Eric K. Mann, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1602 days.

(21) Appl. No.: 11/385,130

(22) Filed: Mar. 20, 2006

(65) Prior Publication Data

US 2007/0217409 A1    Sep. 20, 2007

(51) Int. Cl.
*H04L 12/56* (2006.01)
(52) U.S. Cl. .................. 370/389; 370/253; 370/349
(58) Field of Classification Search ........... 370/389.316, 370/395; 709/214, 238, 250
See application file for complete search history.

(56) References Cited

U.S. PATENT DOCUMENTS

| | | | | |
|---|---|---|---|---|
| 5,912,891 | A * | 6/1999 | Kanai | 370/395.51 |
| 6,128,738 | A * | 10/2000 | Doyle et al. | 713/185 |
| 6,370,126 | B1 * | 4/2002 | De Baere et al. | 370/316 |
| 6,535,518 | B1 * | 3/2003 | Hu et al. | 370/401 |
| 6,654,806 | B2 * | 11/2003 | Wall et al. | 709/225 |
| 6,760,781 | B1 * | 7/2004 | Wang et al. | 709/250 |
| 6,799,220 | B1 * | 9/2004 | Merritt et al. | 709/238 |
| 6,920,485 | B2 * | 7/2005 | Russell | 709/214 |
| 7,471,689 | B1 * | 12/2008 | Tripathi et al. | 370/395.42 |
| 7,542,476 | B2 * | 6/2009 | Almog et al. | 370/401 |
| 7,606,933 | B2 * | 10/2009 | Reinhard et al. | 709/238 |
| 2003/0051026 | A1 * | 3/2003 | Carter et al. | 709/224 |
| 2003/0069938 | A1 * | 4/2003 | Russell | 709/213 |
| 2004/0268358 | A1 * | 12/2004 | Darling et al. | 718/105 |
| 2005/0015642 | A1 * | 1/2005 | Hannel et al. | 714/4 |
| 2007/0091926 | A1 * | 4/2007 | Apostolopoulos et al. | 370/473 |
| 2007/0094397 | A1 * | 4/2007 | Krelbaum et al. | 709/227 |
| 2008/0301298 | A1 * | 12/2008 | Bernardi et al. | 709/226 |

FOREIGN PATENT DOCUMENTS

WO   WO/2007/005544   *  1/2007

* cited by examiner

*Primary Examiner* — Dang Ton
*Assistant Examiner* — Pamit Kaur
(74) *Attorney, Agent, or Firm* — Blakely, Sokoloff, Taylor & Zafman LLP

(57) ABSTRACT

An embodiment of the present invention is a technique to tag network transactions. A virtual queue stores packets received from and transmitted to a network interface card (NIC). A global session manager manages packet communication with a capability operating system (COS). A global virtual machine (VM) database stores global session identifiers (SIDs) of the packets and associated metadata. The global SIDs are used by the global session manager to track network sessions. The metadata describe characteristics of session connections. A VM tunnel connection encapsulates the packets passing to and from the COS.

23 Claims, 10 Drawing Sheets

(12) United States Patent
US 8,295,275 B2

TAGGING NETWORK I/O TRANSACTIONS IN A VIRTUAL MACHINE RUN-TIME ENVIRONMENT

BACKGROUND

1. Field of the Invention

Embodiments of the invention relate to the field of virtualization technology, and more specifically, to embedded information technology.

2. Description of Related Art

In a virtualized platform environment, the networking resources of the platform may be emulated or shared among one or more virtual machines (VMs) running on the platform. The network resources may be coordinated and managed by a sole privileged input/output (IO) virtual machine (IOVM) which provides virtualized IO services to other VMs. One application of virtualization technology is embedded information technology (EIT) where a privileged IO domain controls access to network resources on the platform. This privileged domain provides various packet filtering, network firewall, and packet inspection services to detect intrusion, viruses, spyware, etc. based on the packet traffic. It runs in an environment that is separate and isolated from the application that the end user utilizes to access the network.

One limitation of this approach is that much contextual information about the network packets and traffic may be lost when the data is transferred between the two domains. In addition, using firewalls configured by pre-determined network policies leads to inefficient utilization of resources such as physical queues and packet filters.

BRIEF DESCRIPTION OF THE DRAWINGS

Embodiments of invention may best be understood by referring to the following description and accompanying drawings that are used to illustrate embodiments of the invention. In the drawings.

DESCRIPTION

An embodiment of the present invention is a technique to tag network transactions. A virtual queue stores packets received from and transmitted to a network interface card (NIC). A global session manager manages packet communication with a capability operating system (COS). A global virtual machine (VM) database stores global session identifiers (SIDs) of the packets and associated metadata. The global SIDs are used by the global session manager to track network sessions. The metadata describe characteristics of session connections. A VM tunnel connection encapsulates the packets passing to and from the COS.

In the following description, numerous specific details are set forth. However, it is understood that embodiments of the invention may be practiced without these specific details. In other instances, well-known circuits, structures, and techniques have not been shown to avoid obscuring the understanding of this description.

One embodiment of the invention may be described as a process, which is usually depicted as a flowchart, a flow diagram, a structure diagram, or a block diagram. Although a flowchart may describe the operations as a sequential process, many of the operations can be performed in parallel or concurrently. A loop or iterations in a flowchart may be described by a single iteration. It is understood that a loop index or loop indices or counter or counters are maintained to update the associated counters or pointers. In addition, the order of the operations may be re-arranged. A process terminates when its operations are completed. A process may correspond to a method, a program, a procedure, etc. A block diagram may contain blocks or modules that describe an element, an item, a component, a device, a unit, a subunit, a structure, a method, a process, a function, an operation, a functionality, or a task, etc. A functionality or an operation may be performed automatically or manually.

One embodiment of the invention is a technique to process network transactions in a virtualized platform environment. SIDs are assigned or tagged to packets to facilitate the sorting of packets into appropriate queues destined to, or originated from, corresponding user applications. The generation of the tags or IDs enables the networking system to allocate and assign network resources (e.g., queues, connections) before they are needed. The network traffic may be disabled or audited via access control based on the SID which may associate a network connection with a VM, and optionally to a user and process. The technique also provides a mechanism to contain the impact of a malicious or compromised VM. When a VM becomes compromised or maliciously attacked, all SIDs associated with it may be disabled or marked for audit. An authorized IT user or administrator may then access the VM to conduct repairs or perform corrective actions on the VM partition.

Figure 1A:
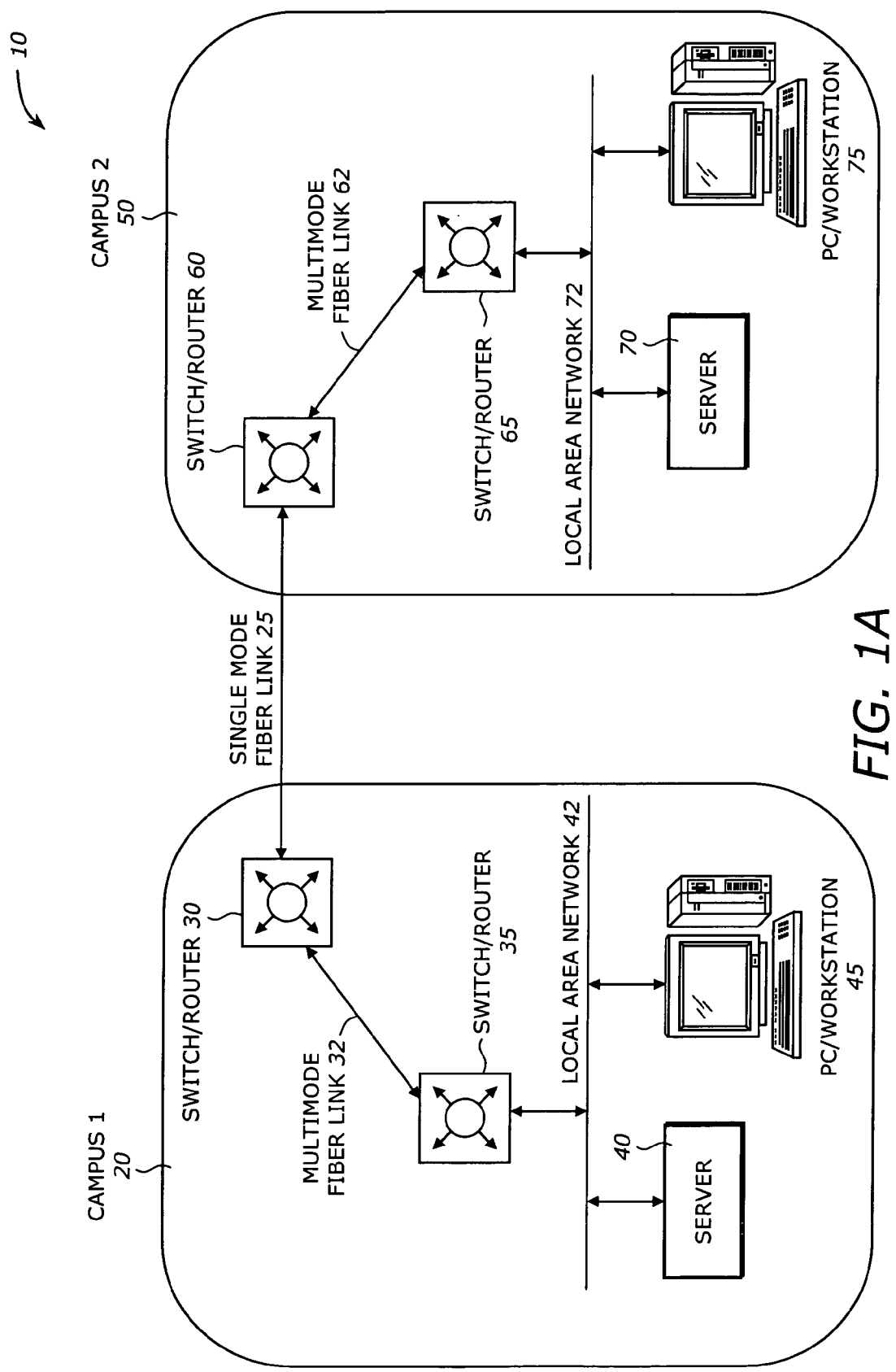
FIG. 1A is a diagram illustrating a network system in which one embodiment of the invention can be practiced.

FIG. 1A is a diagram illustrating a system 100 in which one embodiment of the invention can be practiced. The system 100 represents a Local Area Network (LAN) applications using 10 Gigabit Ethernet. The system 100 includes two campuses 20 and 50 and link 25.

Each of the campuses 20 and 50 represents an enterprise using network interconnections to link personal computers (PCs), workstations, and servers. They may have aggregation of multiple 1000BASE-X or 1000BASE-T segments into 10 Gigabit Ethernet downlinks. The link 25 may be a single mode fiber link that connects the two campuses 20 and 50 over a long distance (e.g., 40 km).

Campuses 20 and 50 may be similar in their infrastructure. The network in each campus may encompass buildings, data centers, or computer rooms. The campus 20 may include switches/routers, such as switch/router 30 and switch/router 35, and a LAN 42. The campus 50 may include switches/routers, such as switch/router 60 and switch/router 65, and a LAN 72. Switch/routers 30 and 60 are typically located at the edge of the corresponding campuses. They are connected together via the link 25. Switches/routers 30 and 35 are connected via a multimode fiber link 32 over shorter distances (e.g., 30-80 meters) at speed of up to 10 Gigabits per second (Gbps). The switch/router 35 is connected to the LAN 42. Similarly, switches/routers 60 and 65 are connected via a multimode fiber link 62 over shorter distances (e.g., 30-80 meters) at speed of up to 10 Gigabits per second (Gbps). The switch/router 65 is connected to the LAN 72.

The LAN 42 provides connectivity to servers, PCs, or workstations, such as a server 40 and a personal computer (PC)/workstation 45. Similarly, the LAN 72 provides network connectivity to servers, PCs, or workstations, such as a server 70 and a PC/workstation 75. The server 40 or 70 provides specific operations to support the computing environment. They may be a print server connected to a variety of printers, a storage server connected to mass storage devices such as tape drive, redundant arrays of inexpensive disks (RAIDs), a media server to provide multimedia services such as video, audio, or graphics, or any server with specific functions. Each server typically includes one or more network interface cards (NICs) with network connectivity to the corresponding LAN. The PC/workstation 45 or 75 may be a processing system running a virtualization platform environment.

Figure 1B:
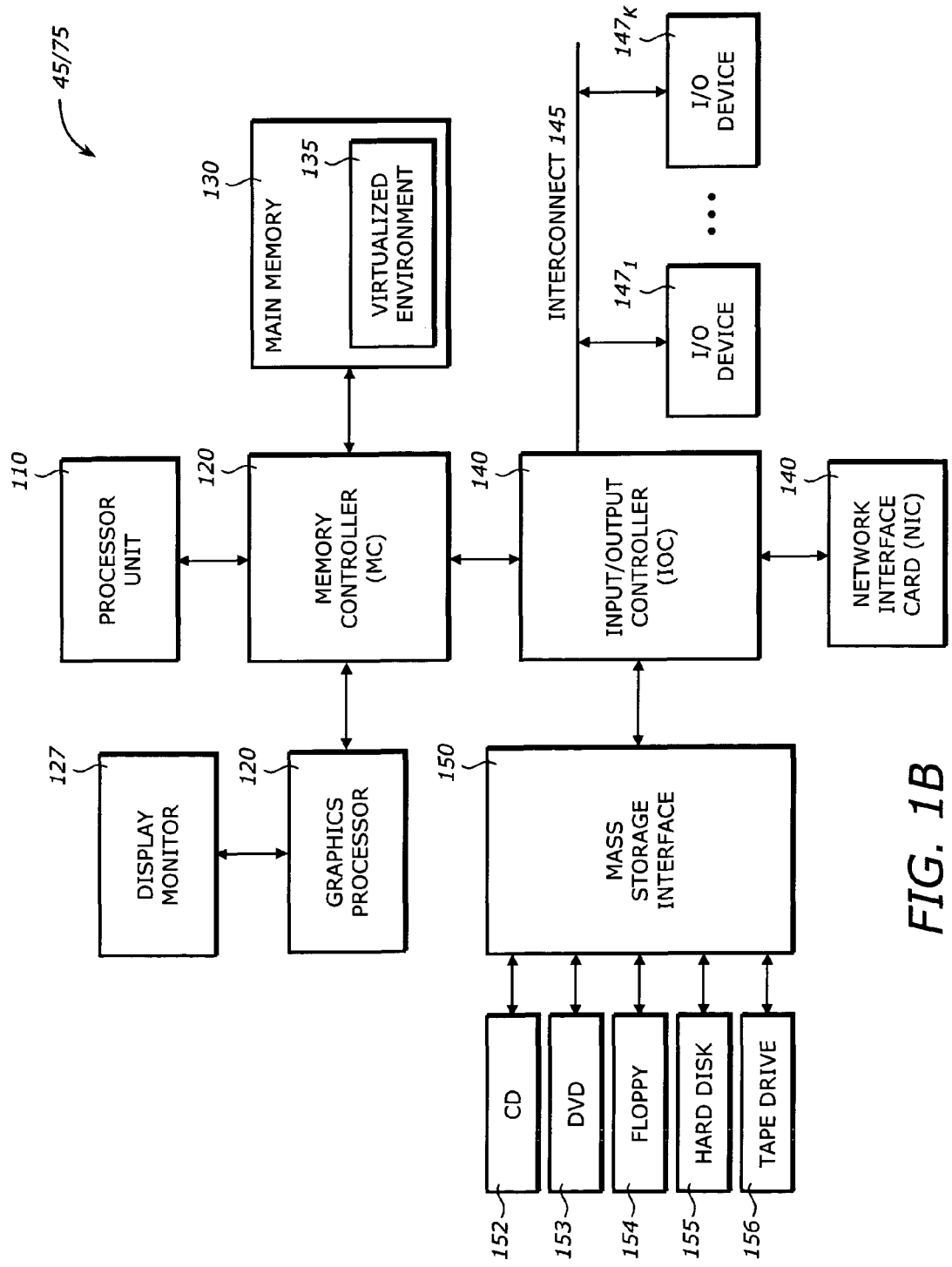
FIG. 1B is a diagram illustrating a processing system according to one embodiment of the invention.

FIG. 1B is a diagram illustrating the processing system 45/75 in which one embodiment of the invention can be practiced. The system 45/75 includes a processor unit 110, a memory controller (MC) 120, a main memory 130, a graphics processor 125, an input/output controller (IOC) 140, an interconnect 145, a mass storage interface 150, input/output (I/O) devices 147$_1$ to 147$_K$, and a network interface card (NIC) 160.

The processor unit 110 represents a central processing unit of any type of architecture, such as processors using hyper threading, security, network, digital media technologies, single-core processors, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The MC 120 provides control and configuration of memory and input/output devices such as the main memory 130 and the IOC 140. The MC 120 may be integrated into a chipset that integrates multiple functionalities such as graphics, media, isolated execution mode, host-to-peripheral bus interface, memory control, power management, etc. The MC 120 or the memory controller functionality in the MC 120 may be integrated in the processor unit 110. In some embodiments, the memory controller, either internal or external to the processor unit 110, may work for all cores or processors in the processor unit 110. In other embodiments, it may include different portions that may work separately for different cores or processors in the processor unit 110.

The main memory 130 stores system code and data. The main memory 130 is typically implemented with dynamic random access memory (DRAM), static random access memory (SRAM), or any other types of memories including those that do not need to be refreshed. The main memory 130 may include multiple channels of memory devices such as DRAMs. The DRAMs may include Double Data Rate (DDR2) devices with a bandwidth of 8.5 Gigabyte per second (GB/s). In one embodiment, the memory 130 includes a virtualized environment 135. The virtualized environment 135 may support embedded information technology (EIT) where a privileged I/O domain controls access to network resources on the platform. The virtualized environment 135 provides the creation of multiple VMs that carry out network communication in a controlled access manner.

The graphics processor 125 is any processor that provides graphics functionalities. The graphics processor 125 may also be integrated into the MC 120 to form a Graphics and Memory Controller (GMC). The graphics processor 125 may be a graphics card such as the Graphics Performance Accelerator (AGP) card, interfaced to the MC 120 via a graphics port such as the Accelerated Graphics Port (AGP) or a peripheral component interconnect (PCI) Express interconnect. The graphics processor 125 provides interface to the display monitor 127 such as standard progressive scan monitor, television (TV)-out device, and Transition Minimized Differential Signaling (TMDS) controller. The display monitor 127 may be any display device such as Cathode Ray Tube (CRT) monitor, TV set, Liquid Crystal Display (LCD), Flat Panel, and Digital CRT.

The IOC 140 has a number of functionalities that are designed to support I/O functions. The IOC 140 may also be integrated into a chipset together or separate from the MC 120 to perform I/O functions. The IOC 140 may include a number of interface and I/O functions such as peripheral component interconnect (PCI) bus interface, processor interface, interrupt controller, direct memory access (DMA) controller, power management logic, timer, system management bus (SMBus), universal serial bus (USB) interface, mass storage interface, low pin count (LPC) interface, wireless interconnect, direct media interface (DMI), etc.

The interconnect 145 provides interface to peripheral devices. The interconnect 145 may be point-to-point or connected to multiple devices. For clarity, not all interconnects are shown. It is contemplated that the interconnect 145 may include any interconnect or bus such as Peripheral Component Interconnect (PCI), PCI Express, Universal Serial Bus (USB), Small Computer System Interface (SCSI), serial SCSI, and Direct Media Interface (DMI), etc.

The mass storage interface 150 interfaces to mass storage devices to store archive information such as code, programs, files, data, and applications. The mass storage interface may include SCSI, serial SCSI, Advanced Technology Attachment (ATA) (parallel and/or serial), Integrated Drive Electronics (IDE), enhanced IDE, ATA Packet Interface (ATAPI), etc. The mass storage device may include compact disk (CD) read-only memory (ROM) 152, digital video/versatile disc (DVD) 153, floppy drive 154, and hard drive 155, tape drive 156, and any other magnetic or optic storage devices. The mass storage device provides a mechanism to read machine-accessible media.

The I/O devices 147$_1$ to 147$_K$ may include any I/O devices to perform I/O functions. Examples of I/O devices 147$_1$ to 147$_K$ include controller for input devices (e.g., keyboard, mouse, trackball, pointing device), media card (e.g., audio, video, graphic), network card, and any other peripheral controllers.

The NIC 160 provides network connectivity to the server 40/70. In one embodiment, the NIC 160 is compatible with both 32-bit and 64-bit peripheral component interconnect (PCI) bus standards. It is typically compliant with PCI local bus revision 2.2, PCI-X local bus revision 1.0, or PCI-Express standards. There may be more than one NIC 160 in the processing system. Typically, the NIC 160 supports standard Ethernet minimum and maximum frame sizes (64 to 1518 bytes), frame format, and Institute of Electronics and Electrical Engineers (IEEE) 802.2 Local Link Control (LLC) specifications. It may also support full-duplex Gigabit Ethernet interface, frame-based flow control, and other standards defining the physical layer and data link layer of wired Ethernet. It may be support copper Gigabit Ethernet defined by IEEE 802.3ab or fiber-optic Gigabit Ethernet defined by IEEE 802.3z.

The NIC 160 may also be a host bus adapter (HBA) such as a Small System Small Interface (SCSI) host adapter or a Fiber Channel (FC) host adapter. The SCSI host adapter may contain hardware and firmware on board to execute SCSI transactions or an adapter Basic Input/Output System (BIOS) to boot from a SCSI device or configure the SCSI host adapter. The FC host adapter may be used to interface to a Fiber Channel bus. It may operate at high speed (e.g., 2 Gbps) with auto speed negotiation with 1 Gbps Fiber Channel Storage Area Network (SANs). It may be supported by appropriate firmware or software to provide discovery, reporting, and management of local and remote HBAs with both in-band FC or out-of-band Internet Protocol (IP) support. It may have frame level multiplexing and out of order frame reassembly, on-board context cache for fabric support, and end-to-end data protection with hardware parity and cyclic redundancy code (CRC) support.

Figure 2:
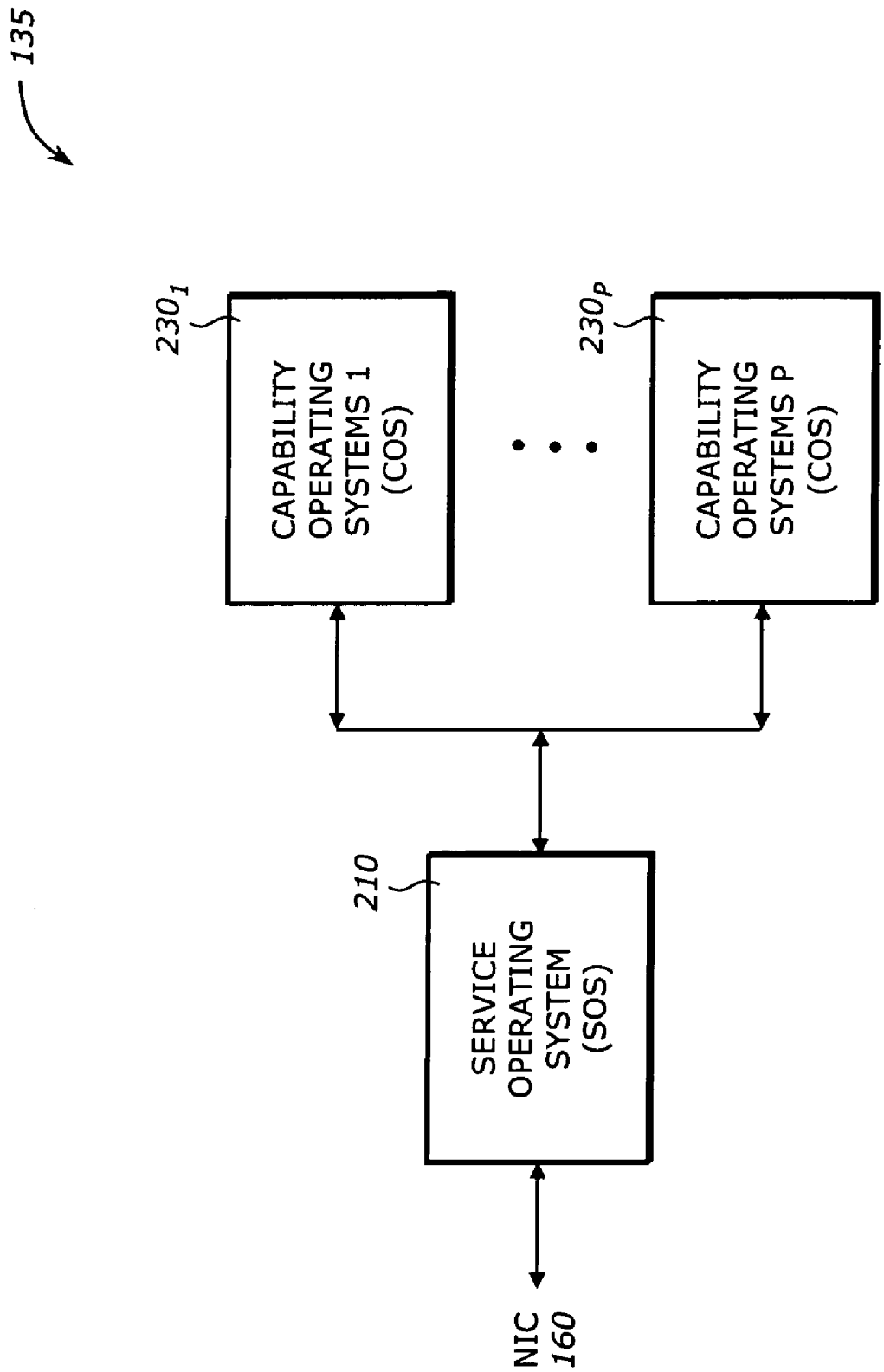
FIG. 2 is a diagram illustrating a virtualized environment according to one embodiment of the invention.

FIG. 2 is a diagram illustrating the virtualized environment 135 shown in FIG. 1B according to one embodiment of the invention. The virtualized environment 135 includes a service operating system (SOS) 210 and P capability operating systems (COS) $230_1$ to $230_P$. There may be more or less than the above components. For example, there may be more than one SOS or only one COS.

The SOS 210 is a privileged domain or partition that provides virtualized I/O services to user applications. It may be implemented as a virtual machine (VM) running on the same platform as the COS $230_1$ to $230_P$. The SOS 210 interfaces to the NIC 160 to receive and transmit I/O packets. It receives the physical I/O packets, sorts and filters the received packets, and transferred to other VMs as appropriate. It also receives transmission requests from I/O client VMs and transmits the packets to the NIC 120 on behalf of services or user applications. It may include the functionality of an input/output virtual machine (IOVM). The SOS 210 may be a component of a trusted partition. It may be launched via a secure boot or its integrity may be attested to in some platform-specific manner. The SOS 210 may represent a virtual machine end point (VMEP) in packet communication with the COS $230_1$ to $230_P$.

Each of the COS $230_1$ to $230_P$ may be a privileged domain or partition and implemented as a VM on the same platform as the SOS 210. It provides a user application that may receive and transmit packets via the SOS 210. Each of the COS $230_1$ to $230_P$ may not be a trusted component and all traffic coming into or out of the COS may be subject to audit and inspection by the SOS 210.

Figure 3:
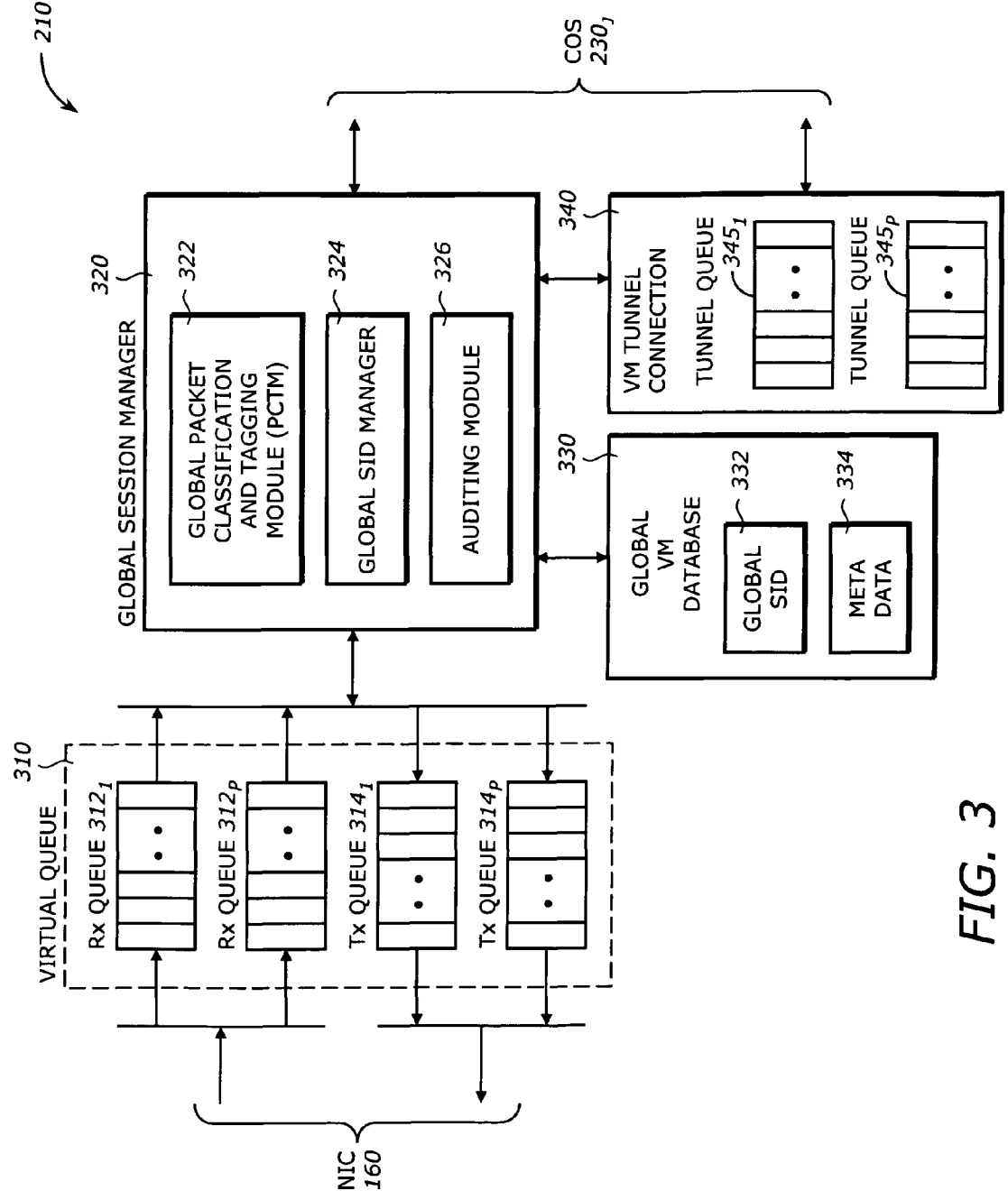
FIG. 3 is a diagram illustrating a service operating system (SOS) according to one embodiment of the invention.

FIG. 3 is a diagram illustrating the service operating system (SOS) 210 shown in FIG. 2 according to one embodiment of the invention. The SOS 210 includes a virtual queue 310, a global session manager 320, a global VM database 330, and a VM tunnel connection 340.

The virtual queue 310 stores packets received and transmitted by the NIC 160. It may include receive queues $312_1$ to $312_P$ and transmit queues $314_1$ to $314_P$. Each of the receive queues $312_1$ to $312_P$ and transmit queues $314_1$ to $314_P$ is associated with a corresponding COS $230_j$ (j=1, ..., P). The sorting of the packets to the appropriate queues is performed by the global session manager 320. There may be a temporary receive queue to store packets received by the NIC 160. These packets may then be sorted by the global session manager 320 into the appropriate receive queue before being forwarded to the corresponding COS $230_j$. Each of the receive queues $312_1$ to $312_P$ and transmit queues $314_1$ to $314_P$ may be implemented as a queue data structure, such as memory locations pointed to by pointers.

The global session manager 320 manages the packet communication with COS $230_j$ (j=1, ..., P). It may include a global packet classification and tagging module (PCTM) 322, a global session identifier (SID) manager 324, and an auditing module 326.

The global PCTM 322 associates, or tags, a packet with a global SID. It may communicate with a local PCTM in the COS $230_j$ to combine the local SID that the COS $230_j$ assigns to the packet with other information to form the global SID. It then uses the global SID as a hint to sort the packet into an appropriate queue in the virtual queue or the VM tunnel connection. The global SID may serve two functions. In one function, it provides an index to look up the associated metadata in the global VM database 330. In another function, it is used to assign input/output traffic. The global SID manager 324 maintains the global SIDs in the global VM database 330. It also maintains a metadata database associated with the global SIDs. The auditing module 326 performs a number of auditing tasks such as inspecting the SIDs and packet contents, triggering an audit process, and post-audit operations.

By tracking the SIDs of the packets, the global session manager 320 may use this information and/or the associated metadata as a hint to sort the packets into appropriate queues. For example, the global session manager 320 may sort a packet destined to the COS $230_j$ into a corresponding tunnel queue $345_j$ (j=1, ..., P) in the VM tunnel connection 340 or the receive queue $312_j$ in the virtual queue 310 using the packet SID. Similarly, it may store a transmit packet originated from the COS $230_j$ using a packet SID associated with the transmit packet in the transmit queue $314_j$ corresponding to the COS $230_j$. Using the SIDs and other information such as the VM identifier (VMID), the global session manager 320 may allocate hardware resources efficiently, reducing the impact caused by congestion or traffic overloading. In addition, the global session manager 320 may use the auditing module 326 to help identifying the nature of any security breach in a VM or contain the impact of a malicious or compromised VM.

The global virtual machine (VM) database 330 stores global SIDs 332 of the packets and associated metadata 334. The global SIDs 332 may be used by the global session manager 320 to track network sessions or transactions. The metadata 334 describe characteristics of session connections. The metadata 334 may include enough information for the global session manager 320 to associate the corresponding packet with the destination COS$_j$. The information may include the VM identifier (ID), the process ID, or the user ID. Any additional information that may describe or characterize the packet, the session, the connection, or the platform may be used. Examples of the additional information may include security credentials, session ID, policy ID, application ID, and encryption keys.

The VM tunnel connection 340 encapsulates the packets passing to and from the COS $230_j$ (j=1, ..., P). The VM tunnel connection 340 provides common access to both the SOS 210 and the COS $230_j$. It may be implemented by a shared memory segment or a dynamically mapped memory page. In the shared memory segment implementation, a memory segment is reserved and mapped into the VM address spaces of both the associated COS $230_j$ and the SOS 210 where the data exchanges or packet communication take place. The memory segment may then be shared by any method. For example, in an alternate usage method, the COS $230_j$ may copy the data into the shared memory segment, and then send a signal or wake up the SOS 210 to service the data transfer request. In the dynamically mapped page implementation, the network data or the packets into and out of the VMs are dynamically mapped and unmapped on demand. For example, the pages of the network data may be pinned, or locked, to some physical memory to prevent relocation. Then, a call may be made to the virtual memory monitor (VMM) to map the page to the SOS address space. The COS $230_j$ may then wake up the SOS 210 to service the data transfer request. Thereafter, the SOS 210 may either (i) call into the VMM to exchange some physical memory that it owns for the original memory from the COS $230_j$, or (ii) process the network data and then call back into the VMM to remove the page mapping. The processor utilization and latency performance for the shared memory segment method is better for small data exchanges. For large data exchanges, the dynamically mapped memory page method is better. The VM tunnel connection 340 may include tunnel queues $345_1$ to $345_P$ that are associated with the COS $230_j$'s (j=1, ..., P). The global session manager 320 may use the VM SIDs as a hint to accelerate the sorting of the packets into the appropriate tunnel queues that are destined to the COS $230_j$.

Figure 4:
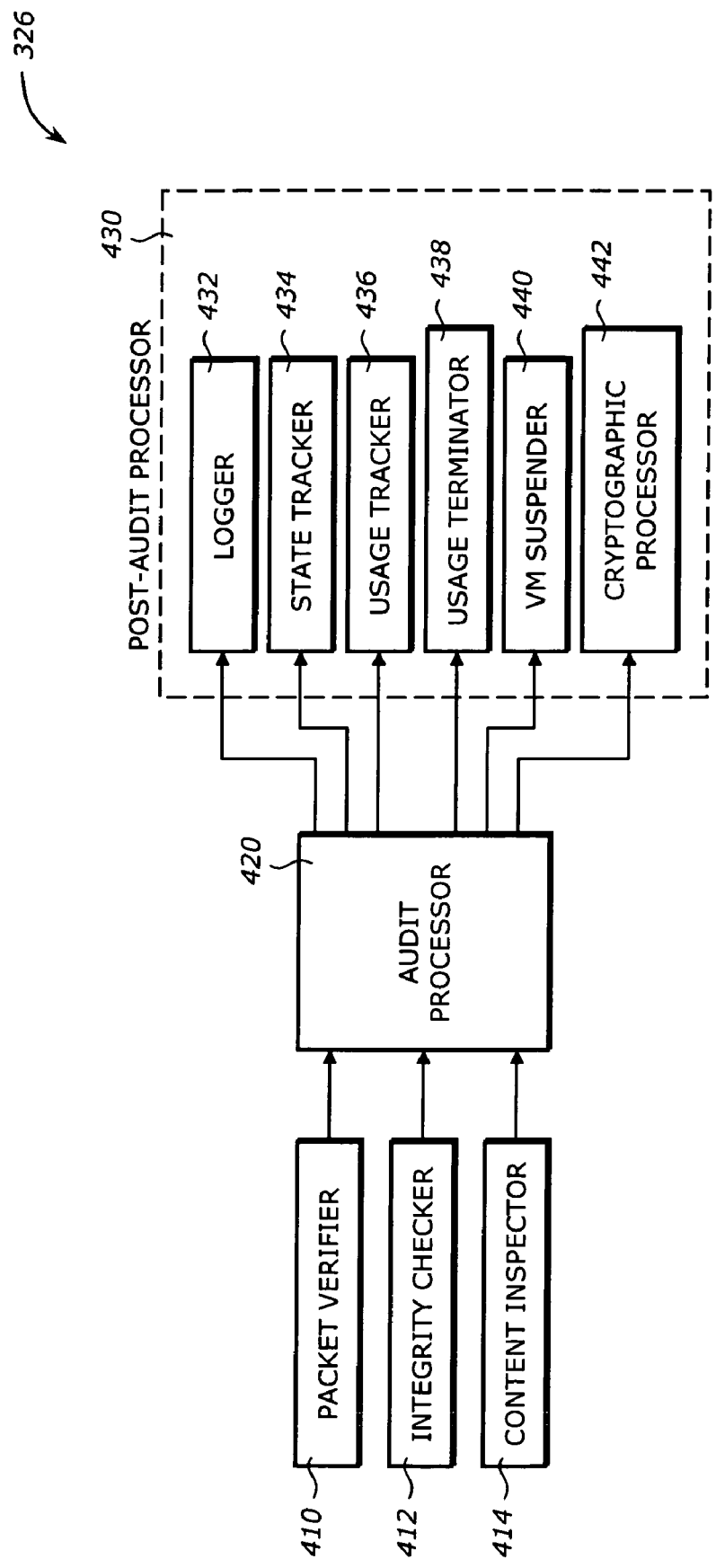
FIG. 4 is a diagram illustrating an auditing module according to one embodiment of the invention.

FIG. 4 is a diagram illustrating the auditing module 326 shown in FIG. 3 according to one embodiment of the invention. The auditing module 326 includes a packet verifier 410, an integrity checker 412, a content inspector 414, an auditing processor 420, and a post-audit processor 430.

The packet verifier 410 verifies a source or destination of a packet. The integrity checker 412 checks integrity of communication protocol. The content inspector 414 inspects data content of a packet.

The auditing processor 420 performs a number of auditing functions. The auditing functions may include a random inspection of packets on an established SID, a periodic sampling, a determination if a threshold of established or created sessions has been exceeded, an inspection of a first number of packets or bytes that are sent or received immediately after a session is established, and an inspection of a packet that fails to be associated with an SID.

The post-audit processor 430 performs one or more functions after the auditing process. It may include a logger 432 to log activity and data content, a state tracker 434 to track persistent state of a session, a usage tracker 436 to track usage quotas, a usage terminator 438 to terminate usage, a VM suspender 440 to suspend a VM, and a cryptographic processor 442 to perform encryption or decryption of data. The post-audit processor 430 helps containing a malicious or compromised VM by operations such as usage termination or VM suspension when the auditing processor 420 returns a finding that the packet may have been contaminated or maliciously attacked.

Figure 5:
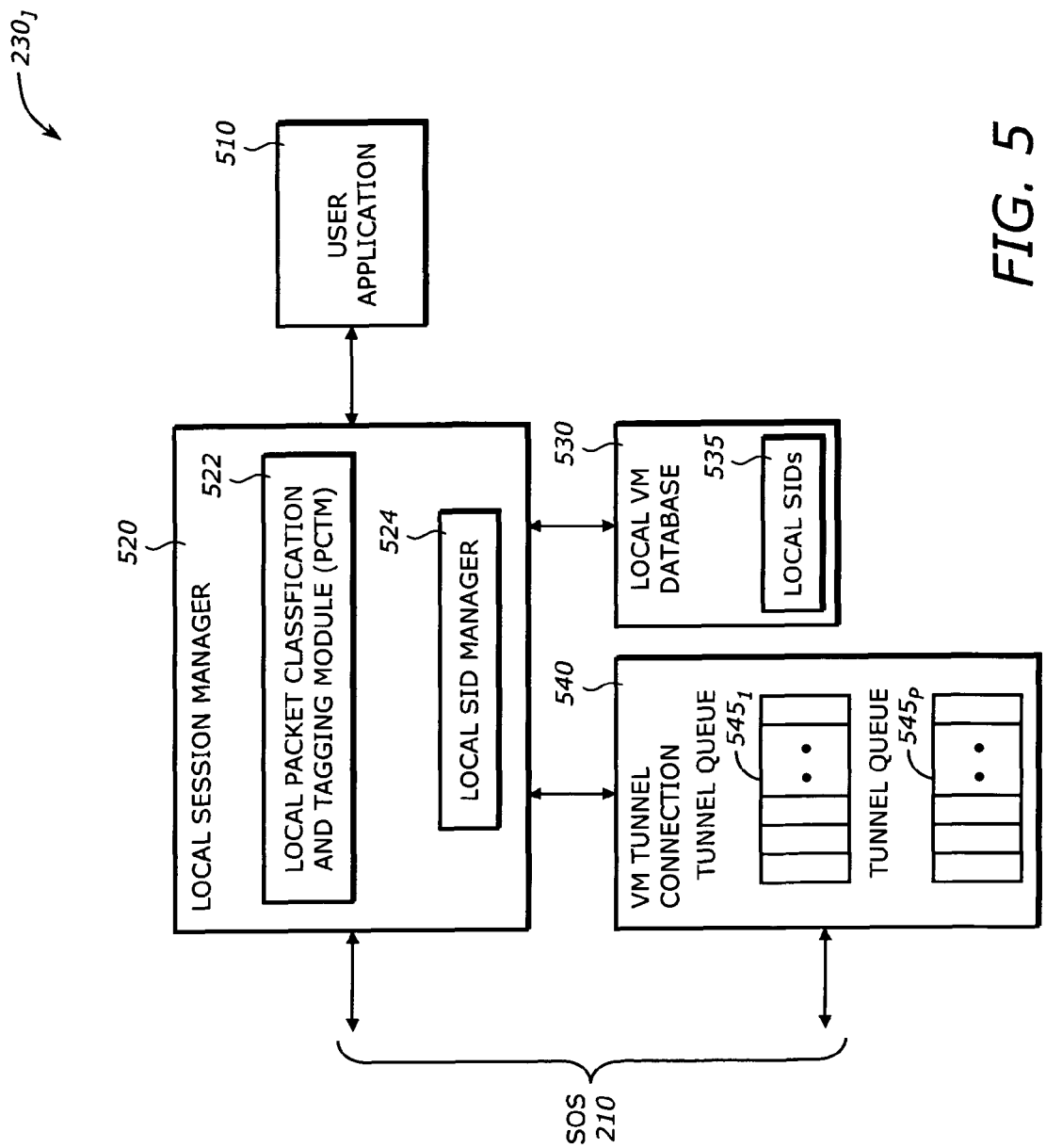
FIG. 5 is a diagram illustrating a capability operating system (COS) according to one embodiment of the invention.

FIG. 5 is a diagram illustrating the COS $230_j$ according to one embodiment of the invention. The COS $230_j$ includes a user application 510, a local session manager 520, a local VM database 530, and a VM tunnel connection 540.

The user application 510 is an application launched by an end user. The user application 510 receives and transmits packets from and to, or performs data exchanges with, the SOS 210.

The local session manager 520 manages packet communication with the SOS 210. It includes a local packet classification and tagging module (PTCM) 522 to associate a packet with a local session identifier (SID), and a local SID manager 524 to maintain the local SIDs in the local VM database 530.

The local VM database 530 store local SIDs 535 of the packets. The local SIDs 535 are used by the local session manager 520 to track local network sessions.

The VM tunnel connection 540 encapsulates the packets passing to and from the SOS 210. As discussed above, the VM tunnel connection 540 may be implemented by a shared memory segment or a dynamically mapped page. It may include P tunnel queues $545_1$ to $545_P$. The VM tunnel connection 540 may be logically or physically mapped to the VM tunnel connection 340 depending on ho they are implemented.

Figure 6A:
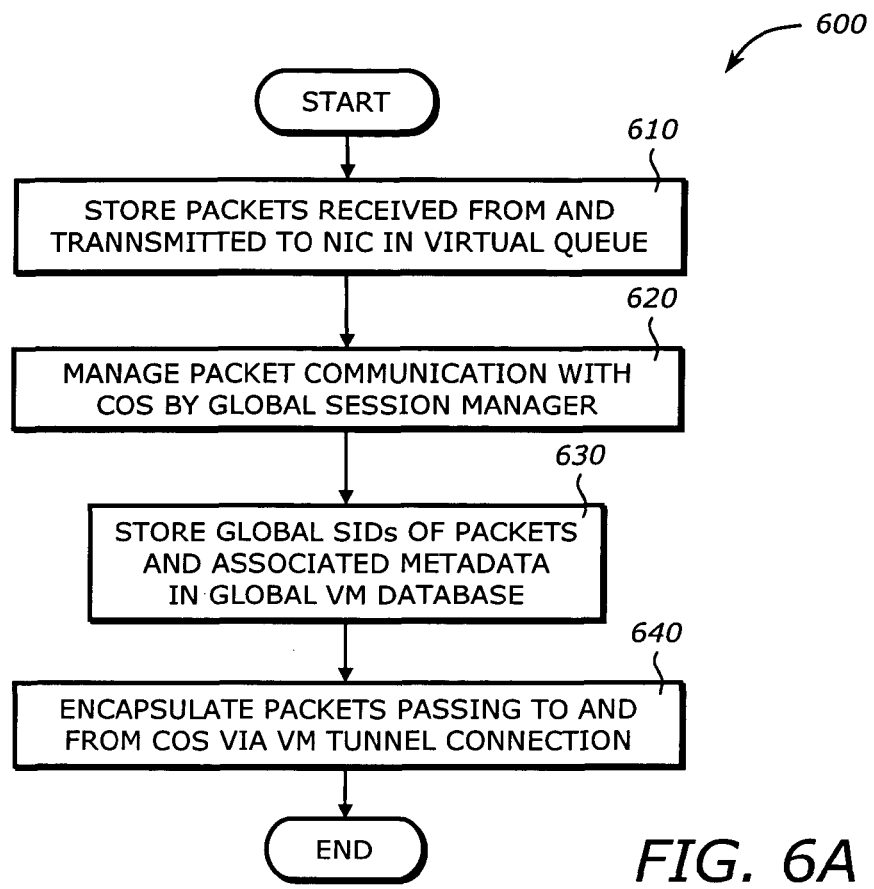
FIG. 6A is a flowchart illustrating a process to process network transactions using the SOS according to one embodiment of the invention.

FIG. 6A is a flowchart illustrating a process 600 to process network transactions using the SOS according to one embodiment of the invention.

Upon START, the process 600 stores packets received from and transmitted to a NIC in a virtual queue (Block 610). This may include storing a receive packet destined to the COS using a packet SID associated with the receive packet in a receive queue corresponding to the COS, and storing a transmit packet originated from the COS using a packet SID associated with the transmit packet in a transmit queue corresponding to the COS.

Next, the process 600 manages packet communication with a COS by a global session manager (Block 620). Then, the process 600 stores global SIDs of the packets and associated metadata in a global VM database (Block 630). The global SIDs may be used by the global session manager to track network sessions. The metadata describe characteristics of session connections.

Then, the process 600 encapsulates the packets passing to and from the COS via a VM tunnel connection (Block 640). The encapsulation may include sorting the packets into appropriate tunnel queue destined to corresponding COSes using the VM SIDs. The process 600 is then terminated.

Figure 6B:
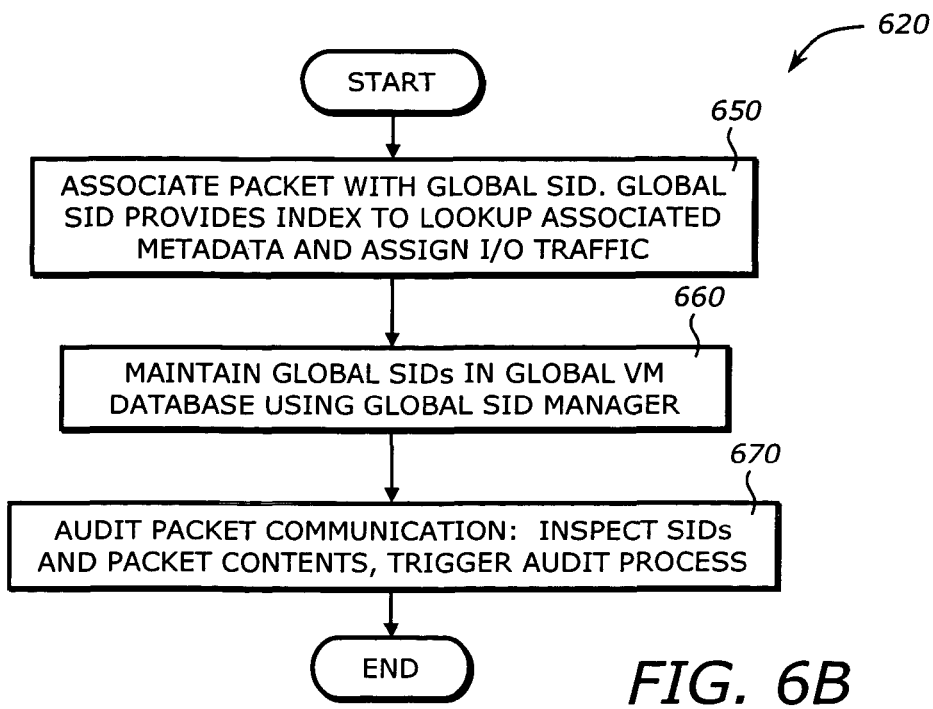
FIG. 6B is a flowchart illustrating a process to manage packet communication in the SOS according to one embodiment of the invention.

FIG. 6B is a flowchart illustrating the process 620 shown in FIG. 6A to manage packet communication in the SOS according to one embodiment of the invention.

Upon START, the process 620 associates, or tags, a packet with a global SID using a PTCM (Block 650). The global SID provides an index to look up the associated metadata in the global VM database and to assign input/output traffic.

Next, the process 620 maintains the global SIDs in the global VM database using a global SID manager (Block 660). Then, the process 620 audits the packet communication, including inspecting the SIDs and packet contents, and triggering an audit process (Block 670). The inspection of the SIDs and the packet contents may include verifying a source or destination of a packet, checking integrity of communication protocol, and inspecting data content of a packet. The audit process may be one of a random inspection of packets on an established SID, a periodic sampling, a determination if a threshold of established or created sessions has been exceeded, an inspection of a first number of packets or bytes that are sent or received immediately after a session is established, and an inspection of a packet that fails to be associated with an SID. After the audit process, the process 620 may perform additional operations, including logging activity and data content, tracking persistent state of a session, tracking usage quotas, terminating usage, suspending a VM, and performing encryption or decryption of data. The process 620 is then terminated.

Figure 7A:
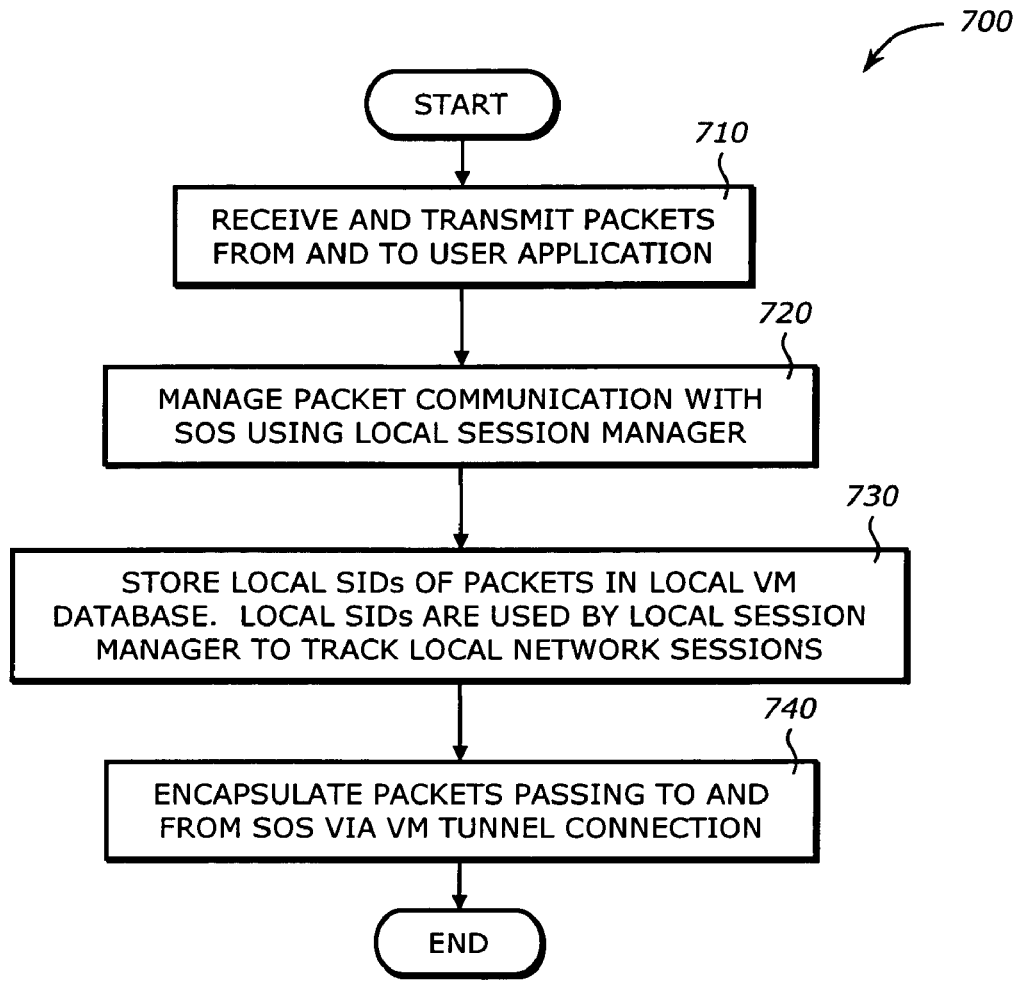
FIG. 7A is a flowchart illustrating a process to process network transactions using the COS according to one embodiment of the invention.

FIG. 7A is a flowchart illustrating a process 700 to process network transactions using the COS according to one embodiment of the invention.

Upon START, the process 700 receives and transmits packets from and to an end user application (Block 710). Then, the process 700 manages packet communication with a SOS using a local session manager (Block 720).

Next, the process 700 stores local SIDs of the packets in a local VM database (Block 730). The local SIDs may be used by the local session manager to track local network sessions. Then, the process 700 encapsulates the packets passing to and from the SOS via a VM tunnel connection (Block 740). The process 700 is then terminated.

Figure 7B:
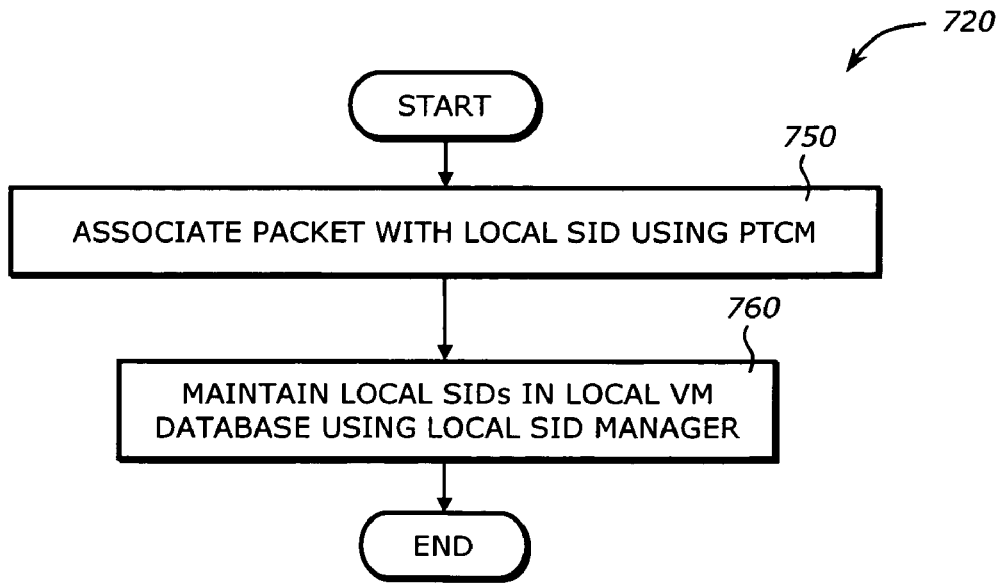
FIG. 7B is a flowchart illustrating a process to manage packet communication in the COS according to one embodiment of the invention.

FIG. 7B is a flowchart illustrating the process 720 shown in FIG. 7A to manage packet communication in the COS according to one embodiment of the invention.

Upon START, the process 720 associates, or tags, a packet with a local SID using a local PTCM (Block 750). Next, the process 720 maintains the local SIDs in the local VM database using a local SID manager (Block 760). This may include keeping track of valid local SIDs, purging invalid or non-use local SIDs, etc. The process 720 is then terminated.

Figure 8:
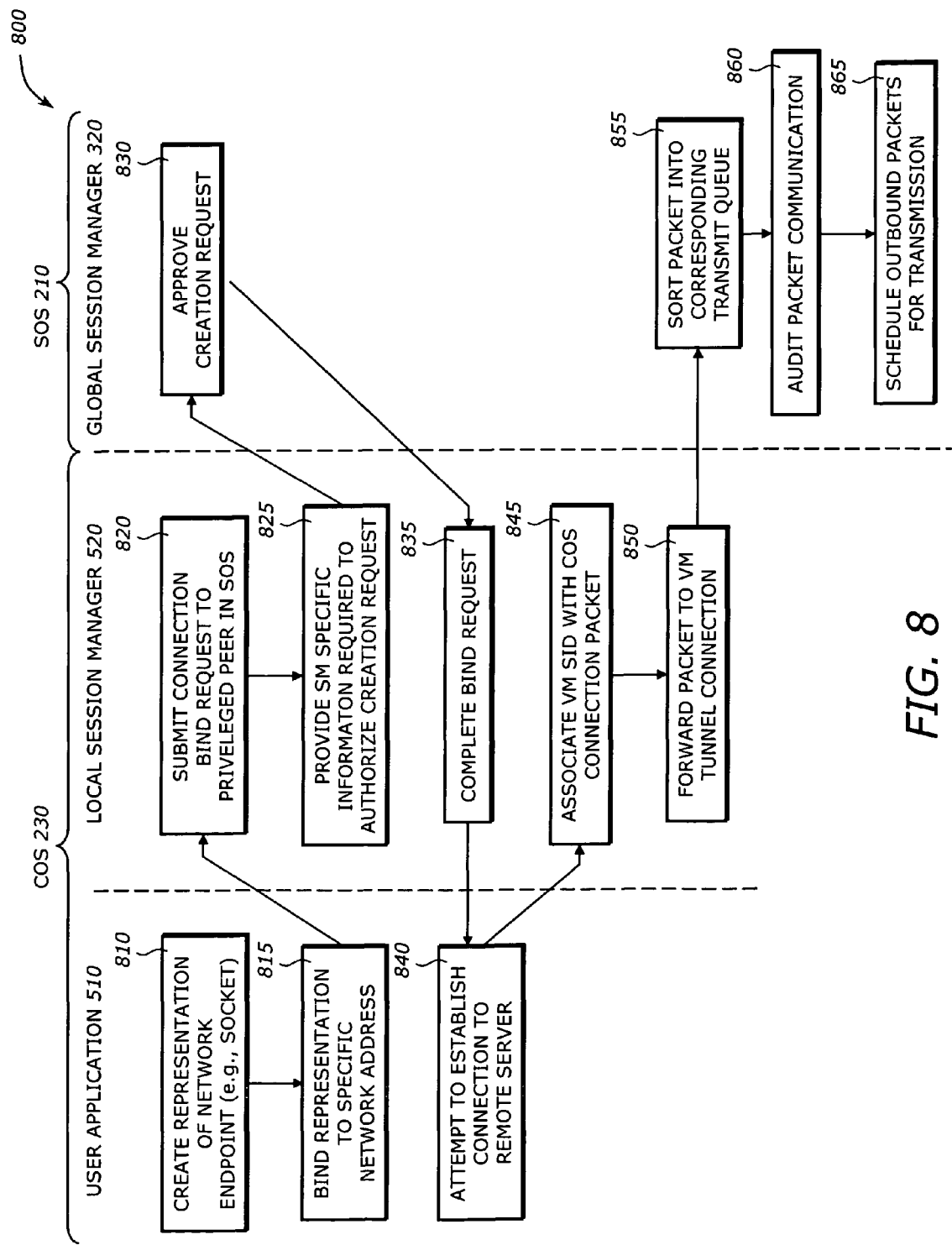
FIG. 8 is a flowchart illustrating a process to transmit packets according to one embodiment of the invention.

FIG. 8 is a flowchart illustrating a process 800 to transmit packets according to one embodiment of the invention. The process 800 illustrates interactions between the SOS 210 and the COS 230 during a transmit transaction from the COS 230 to the SOS 210. The COS 230 includes the user application 510 and the local session manager 520. The SOS 210 includes the global session manager 320.

Upon START, the user application 510 creates a representation of a network endpoint (Block 810). An example of such representation is a socket, or any other equally valid software component. The user application 510 then binds the representation to a specific network address or a specific networking address family (Block 815). An example of such a network-specific address may be AF_NET, IP_ADDRESS=local, PORT=80. The bind request is then intercepted by the local session manager 520.

The local session manager 520 then submits the connection bind request to a privileged peer in the SOS 210 (Block 820). This may be a PTCM in the SOS 210. Then, the local session manager 520 provides specific information required to authorize the creation request (Block 825). The specific information may be any one of VMID, process ID, user ID, application name, user name, or secure hash algorithm (SHA)-1 of the executable image.

The global session manager 320 receives the request and approves the creation request (Block 830) and returns the approval to the COS 230. It may also return a VM SID token to use with subsequent requests. This token may or may not be persistent over the lifetime of the connection. Upon receipt of the approval, the local session manager 520 in the COS 230 completes the bind request to the user application (Block 835) and notifies the user application 510. The user application 510 then attempts to establish connection to a remote server (Block 840). An example of such a connection is a connect( ) call in Transmission Control Protocol (TCP) sockets terminology. The COS stack generates the corresponding packets required to establish a connection (e.g., a SYN packet).

The local session manager 520 associates the SID with the COS connection packet (Block 845). For example, this may include SYN packet+VM SID token. Then, the local session manager 520 forwards the packet and the associated SID to the VM tunnel connection (Block 850). The global session manager 320 in the SOS 210 obtains the packet from the VM tunnel connection and sorts the packet into the corresponding transmit queue (Block 855). It may use the VM SID as a hint to accelerate the sorting. Then, if necessary, the global session manager 320 audits the packet communication by inspecting the packet (Block 860). If the auditing module authorizes the activity, the global session manager schedules an outbound transmission for the packet in the transmission queue (Block 865). The process 800 is then terminated.

Figure 9:
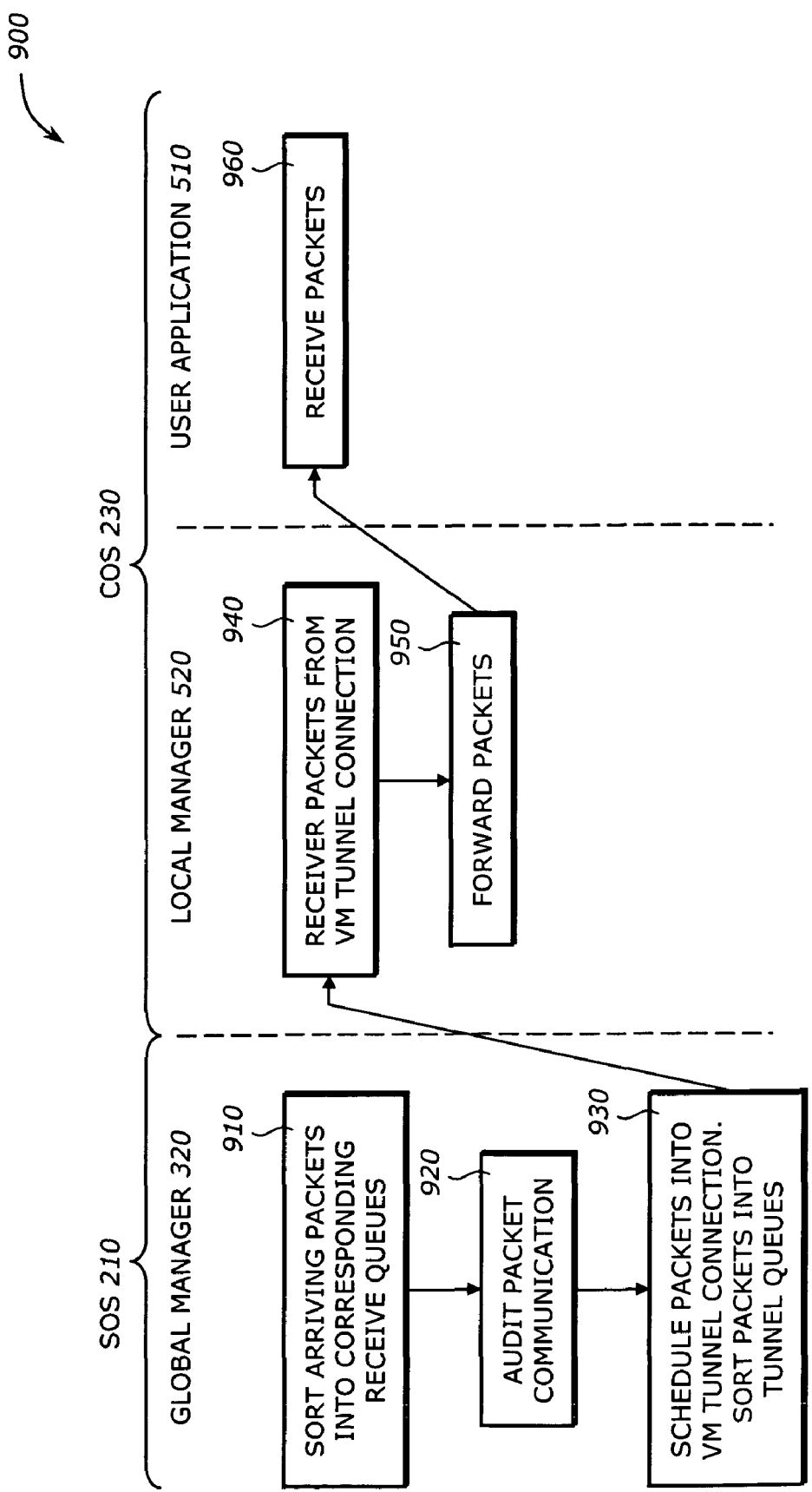
FIG. 9 is a flowchart illustrating a process to receive packets according to one embodiment of the invention.

FIG. 9 is a flowchart illustrating a process 900 to receive packets according to one embodiment of the invention. The process 900 illustrates interactions between the SOS 210 and the COS 230 during a receive transaction from the SOS 210 to the COS 230. The COS 230 includes the user application 510 and the local session manager 520. The SOS 210 includes the global session manager 320.

Upon START, the global session manager 320 in the SOS 210 sorts the arriving packet into the corresponding receive queue using the PTCM (Block 910). The PTCM may use the same or complementary algorithm that the SOS global session manager 320 uses to allocate the VM SIDs. The implementation may use Content Addressable Memories (CAMs), or hash functions based on data found in the packet. For packets which match a valid VM SID, the global session manager 320 uses the VM SID as a hint to accelerate the sorting of the packet into the correct VM tunnel queue destined for the COS 230. Then, the global session manager 320 audits the packet communication if necessary (Block 920). The auditing module in the global session manager 320 may inspect the transaction including the data contents and any other relevant information. If the packet does not match a valid VM SID, the auditing module may dispose it. Next, the global session manager 320 schedules the packet onto the VM tunnel connection (Block 930) to prepare sending the packet to the COS 230.

The local session manager 520 in the COS 230 receives the packet from the VM tunnel connection (Block 940). Then, the local session manager 520 forwards the packet to the user application 510 (Block 950). The user application 510 receives the packet (Block 960). The process 900 is then terminated.

Elements of embodiments of the invention may be implemented by hardware, firmware, software or any combination thereof. The term hardware generally refers to an element having a physical structure such as electronic, electromagnetic, optical, electro-optical, mechanical, electromechanical parts, components, or devices, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), an erasable programmable ROM (EPROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described above. The machine accessible medium may also include program code embedded therein. The program code may include machine readable code to perform the operations described above. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
a virtual queue to store packets received from and transmitted to a network interface card (NIC); a global session manager coupled to the virtual queue to manage packet communication with a capability operating system (COS) in a virtualized environment, the virtualized environment being included in a memory;
a global virtual machine (VM) database coupled to the global session manager to store global session identifiers (SIDS) of the packets and associated metadata, the global SIDS being used by the global session manager to track network sessions by looking up the associated metadata, the metadata describing characteristics of session connections; and a VM tunnel connection coupled to the session manager and the COS to encapsulate the packets passing to and from the COS, the VM tunnel connection being one of a shared memory segment and a dynamically mapped memory page; wherein the global session manager comprises a global packet classification and tagging module (PTCM) to associate a packet with a global session identifier (SID), the global SID providing index to look up the associated metadata in the global VM database and to assign input/output traffic; and a global SID manager to maintain the global SIDS in the global VM database.

2. The apparatus of claim 1 wherein the virtual queue comprises:
a receive queue corresponding to the COS to store a receive packet destined to the COS using a packet SID associated with the receive packet; and
a transmit queue corresponding to the COS to store a transmit packet originated from the COS using a packet SID associated with the transmit packet.

3. The apparatus of claim 1 wherein the global session manager further comprises:
an auditing module to inspect the SIDs and packet contents and trigger an audit process.

4. The apparatus of claim 3 wherein the audit process is one of a random inspection of packets on an established SID, a periodic sampling, a determination if a threshold of established or created sessions has been exceeded, an inspection of a first number of packets or bytes that are sent or received immediately after a session is established, and an inspection of a packet that fails to be associated with an SID.

5. The apparatus of claim 3 wherein the auditing module comprises at least one of:
a packet verifier to verifier a source or destination of a packet;
an integrity checker to check integrity of communication protocol;
a content inspector to inspect data content of a packet;
a logger to log activity and data content;
a state tracker to track persistent state of a session;
a usage tracker to track usage quotas;
a usage terminator to terminate usage;
a VM suspender to suspend a VM; and
a cryptographic processor to perform encryption or decryption of data.

6. The apparatus of claim 1 wherein the VM tunnel connection comprises one of a shared memory segment and a dynamically mapped memory page.

7. An apparatus comprising:
an end user application to receive and transmit packets;
a local session manager coupled to the end user application to manage packet communication with a service operating system (SOS) in a virtualized environment, the virtualized environment being included in a memory;
a local virtual machine (VM) database coupled to the local session manager to store local session identifiers (SIDs) of the packets, the local SIDs being used by the local session manager to track local network sessions; and
a VM tunnel connection coupled to the local session manager and the SOS to encapsulate the packets passing to and from the SOS, the VM tunnel connection being one of a shared memory segment and a dynamically mapped memory page; wherein the local session manager comprises a local packet classification and tagging module (PTCM) to associate a packet with a local session identifier (SID); and a local SID manager to maintain the local SIDs in the local VM database.

8. A method comprising:
storing packets received from and transmitted to a network interface card (NIC) in a virtual queue;
managing packet communication with a capability operating system (COS) in a virtualized environment by a global session manager, the virtualized environment being included in a memory;

storing global session identifiers (SIDS) of the packets and associated metadata in a global virtual machine (VM) database, the global SIDs being used by the global session manager to track network sessions by looking up the associated metadata, the metadata describing characteristics of session connections; and encapsulating the packets passing to and from the COS via a VM tunnel connection, the VM tunnel connection being one of a shared memory segment and a dynamically mapped memory page; wherein managing the packet communication comprises associating a packet with a global session identifier (SID) using a global packet classification and tagging module (PTCM), the global SID providing index to look up the associated metadata in the global VM database and to assign input/output traffic; and maintaining the global SIDS in the global VM database using a global SID manager.

9. The method of claim 8 wherein storing the packets in the virtual queue comprises:

storing a receive packet destined to the COS using a packet SID associated with the receive packet in a receive queue corresponding to the COS; and storing a transmit packet originated from the COS using a packet SID associated with the transmit packet in a transmit queue corresponding to the COS.

10. The method of claim 8 wherein managing the packet communication further comprises:

auditing the packet communication, comprising:
inspecting the SIDs and packet contents; and
triggering an audit process.

11. The method of claim 10 wherein the audit process is one of a random inspection of packets on an established SID, a periodic sampling, a determination if a threshold of established or created sessions has been exceeded, an inspection of a first number of packets or bytes that are sent or received immediately after a session is established, and an inspection of a packet that fails to be associated with an SID.

12. The method of claim 10 wherein auditing comprises at least one of:

verifying a source or destination of a packet;
checking integrity of communication protocol;
inspecting data content of a packet;
logging activity and data content;
tracking persistent state of a session;
tracking usage quotas;
terminating usage;
suspending a VM; and
performing encryption or decryption of data.

13. The method of claim 9 wherein the VM tunnel connection comprises one of a shared memory segment and a dynamically mapped memory page.

14. A method comprising: receiving and transmitting packets from and to an end user application; managing packet communication with a service operating system (SOS) in a virtualized environment using a local session manager, the virtualized environment being included in a memory;

storing local session identifiers (SIDs) of the packets in a local virtual machine (VM) database, the local SIDs being used by the local session manager to track local network sessions; and encapsulating the packets passing to and from the SOS via a VM tunnel connection, the VM tunnel connection being one of a shared memory segment and a dynamically mapped memory page; wherein managing the packet communication comprises associating a packet with a local session identifier (SID) using a local packet classification and tagging module (PTCM); and maintaining the local SIDS in the local VM database using a local SID manager.

15. A system comprising:

a network interface card (NIC) connected to a network to receive and transmit packets, the NIC supporting a full-duplex Gigabit Ethernet interface;

a capability operating system (COS) in a virtualized environment to establish a connection for packet communication to the network via the NIC; and a service operating system (SOS) in the virtualized environment coupled to the NIC and the COS to process network transactions associated with the COS, the SOS comprising: a virtual queue to store packets received from and transmitted to the network interface card (NIC), a global session manager coupled to the virtual queue to manage packet communication with the COS, a global virtual machine (VM) database coupled to the global session manager to store global session identifiers (SIDs) of the packets and associated metadata, the global SIDs being used by the global session manager to track network sessions, the metadata describing characteristics of session connections, and a global VM tunnel connection coupled to the session manager and the COS to encapsulate the packets passing to and from the COS; wherein the global session manager comprises: a global packet classification and tagging module (PTCM) to associate a packet with a global session identifier (SID), the global SID providing index to look up the associated metadata in the global VM database and to assign input/output traffic; and a global SID manager to maintain the global SIDs in the global VM database.

16. The system of claim 15 wherein the virtual queue comprises:

a receive queue corresponding to the COS to store a receive packet destined to the COS using a packet SID associated with the receive packet; and a transmit queue corresponding to the COS to store a transmit packet originated from the COS using a packet SID associated with the transmit packet.

17. The system of claim 15 wherein the global session manager further comprises:

an auditing module to inspect the SIDs and packet contents and trigger an audit process.

18. The system of claim 15 wherein the COS comprises:

an end user application to receive and transmit the packets;
a local session manager coupled to the end user application to manage packet communication with the SOS
a local VM database coupled to the local session manager to store local session identifiers (SIDs) of the packets, the local SIDs being used by the local session manager to track local network sessions; and
a local VM tunnel connection coupled to the local session manager and the SOS to encapsulate the packets passing to and from the SOS.

19. The system of claim 18 wherein the local session manager comprises:

a local packet classification and tagging module (PTCM) to associate a packet with a local session identifier (SID); and a local SID manager to maintain the local SIDs in the local VM database.

20. An article of manufacture comprising:

a non-transitory machine-accessible storage medium having data that, when accessed by a machine, cause the machine to perform operations comprising:

storing packets received from and transmitted to a network interface card (NIC) in a virtual queue; managing packet communication with a capability operating system (COS) in a virtualized environment by a global session manager, the virtualized environment being included in a memory; storing global session identifiers (SIDS) of the packets and associated metadata in a global virtual machine (VM) database, the global SIDS being used by the global session manager to track network sessions by looking up the associated metadata, the metadata describing characteristics of session connections; and encapsulating the packets passing to and from the COS via a VM tunnel connection, the VM tunnel connection being one of a shared memory segment and a dynamically mapped memory page; associating a packet with a global session identifier (SID) using a global packet classification and tagging module (PTCM), the global SID providing index to look up the associated metadata in the global VM database and to assign input/output traffic; and maintaining the global SIDS in the global VM database using a global SID manager.

21. The article of manufacture of claim 20 wherein the data causing the machine to perform storing packets comprises data that, when accessed by a machine, cause the machine to perform operations comprising:

storing a receive packet destined to the COS using a packet SID associated with the receive packet in a receive queue corresponding to the COS; and storing a transmit packet originated from the COS using a packet SID associated with the transmit packet in a transmit queue corresponding to the COS.

22. The article of manufacture of claim 20 wherein the data causing the machine to perform managing packet communication further comprises data that, when accessed by a machine, cause the machine to perform operations comprising:

auditing the packet communication, comprising:
inspecting the SIDs and packet contents; and
triggering an audit process.

23. An article of manufacture comprising:

a non-transitory machine-accessible storage medium having data that, when accessed by a machine, cause the machine to perform operations comprising:

receiving and transmitting packets from and to an end user application;

managing packet communication with a service operating system (SOS) in a virtualized environment using a local session manager, the virtualized environment being included in a memory;

storing local session identifiers (SIDs) of the packets in a local virtual machine (VM) database, the local SIDs being used by the local session manager to track local network sessions; and encapsulating the packets passing to and from the SOS via a VM tunnel connection, the VM tunnel connection being one of a shared memory segment and a dynamically mapped memory page;

associating a packet with a local session identifier (SID) using a local packet classification and tagging module (PTCM); and maintaining the local SIDs in the local VM database using a local SID manager.

* * * * *